UNITED STATES PATENT OFFICE.

HARRY M. WEBER, OF EAST ORANGE, NEW JERSEY, ASSIGNOR TO ELLIS-FOSTER COMPANY, A CORPORATION OF NEW JERSEY.

CHEWING-GUM.

1,248,961.  Specification of Letters Patent.  Patented Dec. 4, 1917.

No Drawing.  Application filed April 7, 1917.  Serial No. 160,486.

*To all whom it may concern:*

Be it known that I, HARRY M. WEBER, a citizen of the United States residing at East Orange, in the county of Essex and State of New Jersey, have invented certain new and useful Improvements in Chewing-Gum, of which the following is a specification.

This invention relates to chewing gum compositions and relates particularly to compositions containing cumarin resin which is a product derived by the polymerization of such bodies as cumarin and indene found in heavy coal tar naphthas.

Cumarin resin may be prepared in various states of plasticity or brittleness and according to the present invention, I preferably employ a product of a readily plastic nature which may be easily incorporated with other ingredients of chewing gum, as for example, chicle, paraffin wax, and the like, together with the usual sweetening and flavoring agents.

In preparing chewing gum it is an object to secure a product which will not soften too readily in hot summer weather nor be highly brittle in winter weather and which will readily assume the proper degree of plasticity when chewed. Chicle answers this purpose very well and is used in large quantities but it is expensive and difficult to thoroughly purify or refine. The cumarin resin may be obtained in various degrees of plasticity and therefore a grade may be selected which adapts itself readily with chicle to produce a plastic mass which moreover is apparently not so sensitive to temperature changes as some of the chewing gum compositions heretofore placed on the market.

A composition illustrative of the present invention is made by incorporating by aid of heat, 4 parts of chicle with 1 to 2 parts of cumarin resin. A quantity of sugar equal to from one-half to three-fourths of the foregoing mixture is boiled with water until the syrup is very concentrated forming a "hair" when tested by the usual candy makers' test. The hot syrup and the melted chicle and resin are incorporated and the usual flavoring ingredients such as peppermint, wintergreen, spearmint, etc., suitably added to the mass and the latter rolled out and sheeted and cut in the manner well known in the art.

Another composition is made by melting 5 parts by weight of plastic cumarin resin with 15 parts of chicle, 10 parts of sugar are boiled with 5 parts of water and admixed with the melted chicle. Peppermint oil is added. The sugar content may be greatly increased if desired. Glycerin, waxes, etc., may also be added in some cases.

The quality of the cumarin resin in some cases is improved by washing and heating with alkali under pressure to remove any traces of coal tar bodies of unpleasant taste or odor. It consists mainly of unsaponifiable bodies. The resin may be similarly purified by acid treatment or other suitable refining process. The different grades of cumarin resin may be readily obtained by distilling in vacuum or other ways the mass of the crude cumarin resin producing fractions of different degrees of viscosity and plasticity, selecting from these such fractions as best blend with the grade of chicle, wax, or other ingredient or compound employed in the particular operation in hand as will now be evident from the description set forth above.

With some of the gum materials or gum bases used in the manufacture of chewing gum and particularly chicle, cumarin resin may be used advantageously as a protective agent, assisting in reducing the tendency of the chicle to oxidize and become of a more or less granular character whereby the chewing properties are impaired. Hence the present invention embraces the use of cumarin resin and particularly a form of this resin free from disagreeable odor and flavor due to the presence of coal tar bodies and especially the use of cumarin resin of a plastic nature readily incorporated with chicle or similar gum basis, and capable of assisting in reducing the degree of oxidation of the gum. Such a mixture or blend is incorporated with sweetening and flavoring agents as required. The presence of cumarin resin appears to assist in retaining the flavor, which I have noted is quite lasting.

What I claim is:—

1. A chewing gum composition comprising chicle, cumarin resin and a sweetening agent.

2. A chewing gum composition comprising cumarin resin and other ingredients forming a plastic mass incorporated with sweetening and flavoring components.

3. A chewing gum composition comprising plastic cumarin resin.

4. A chewing gum composition comprising plastic cumarin resin free from impurities or disagreeable odor and flavor.

5. A chewing gum composition comprising cumarin resin free from disagreeable odor and flavor.

6. A chewing gum comprising a gum basis containing a protective agent comprising cumarin resin, sweetening and flavoring ingredients.

7. A chewing gum composition containing coumarone resin.

HARRY M. WEBER.

It is hereby certified that in Letters Patent No. 1,248,961, granted December 4, 1917, upon the application of Harry M. Weber, of East Orange, New Jersey, for an improvement in "Chewing-Gum," an error appears in the printed specification requiring correction as follows: In the specification and claims, wherever it occurs, for the word "cumarin" read *cumarone;* and that the said Letters Patent should be read with this correction therein that the same may conform to the record of the case in the Patent Office.

Signed and sealed this 26th day of February, A. D., 1918.

[SEAL.]

F. W. H. CLAY,

*Acting Commissioner of Patents.*

Cl. 99—16.